Sept. 6, 1966  E. J. DEVEAU ETAL  3,271,772
SLOT ANTENNA ARRAY WITH SIDE REFLECTORS
Filed Dec. 6, 1962  2 Sheets-Sheet 1
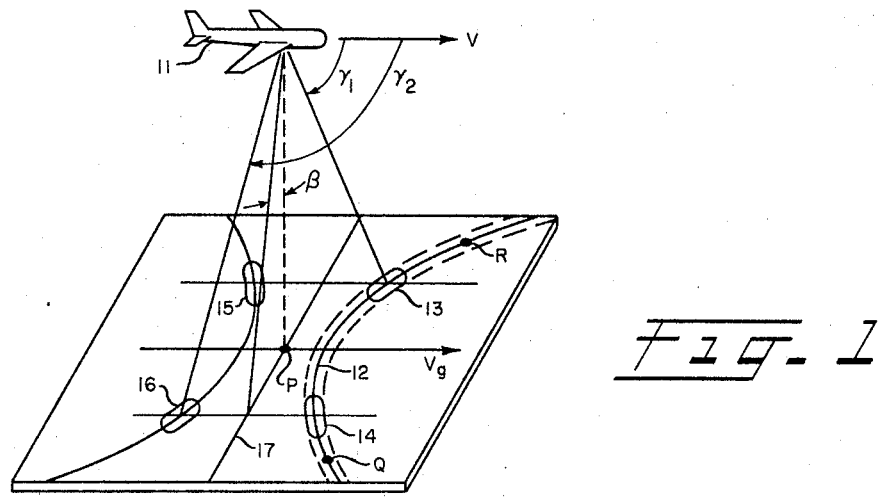
Fig. 1
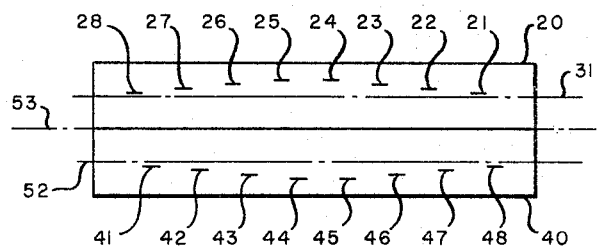
Fig. 3
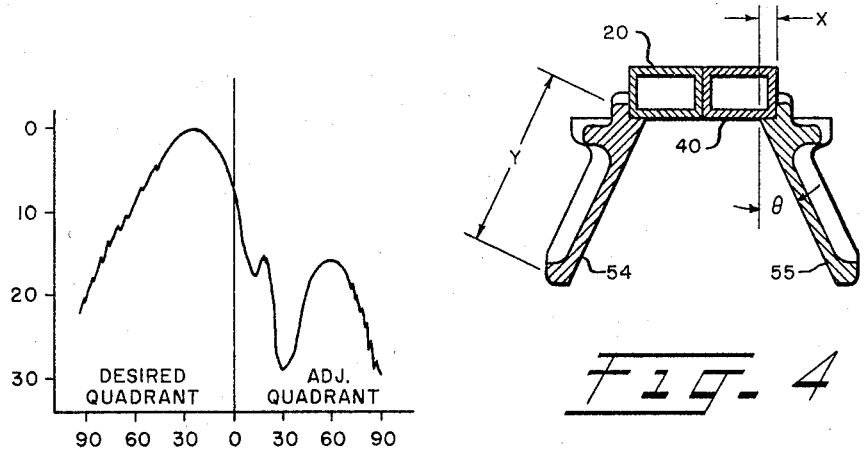
Fig. 4
Fig. 5
INVENTORS
EMILE J. DEVEAU
JOHN C. ROLFS
HUMBERT P. ROSSERO
BY
*H. S. Mackey*
ATTORNEY.

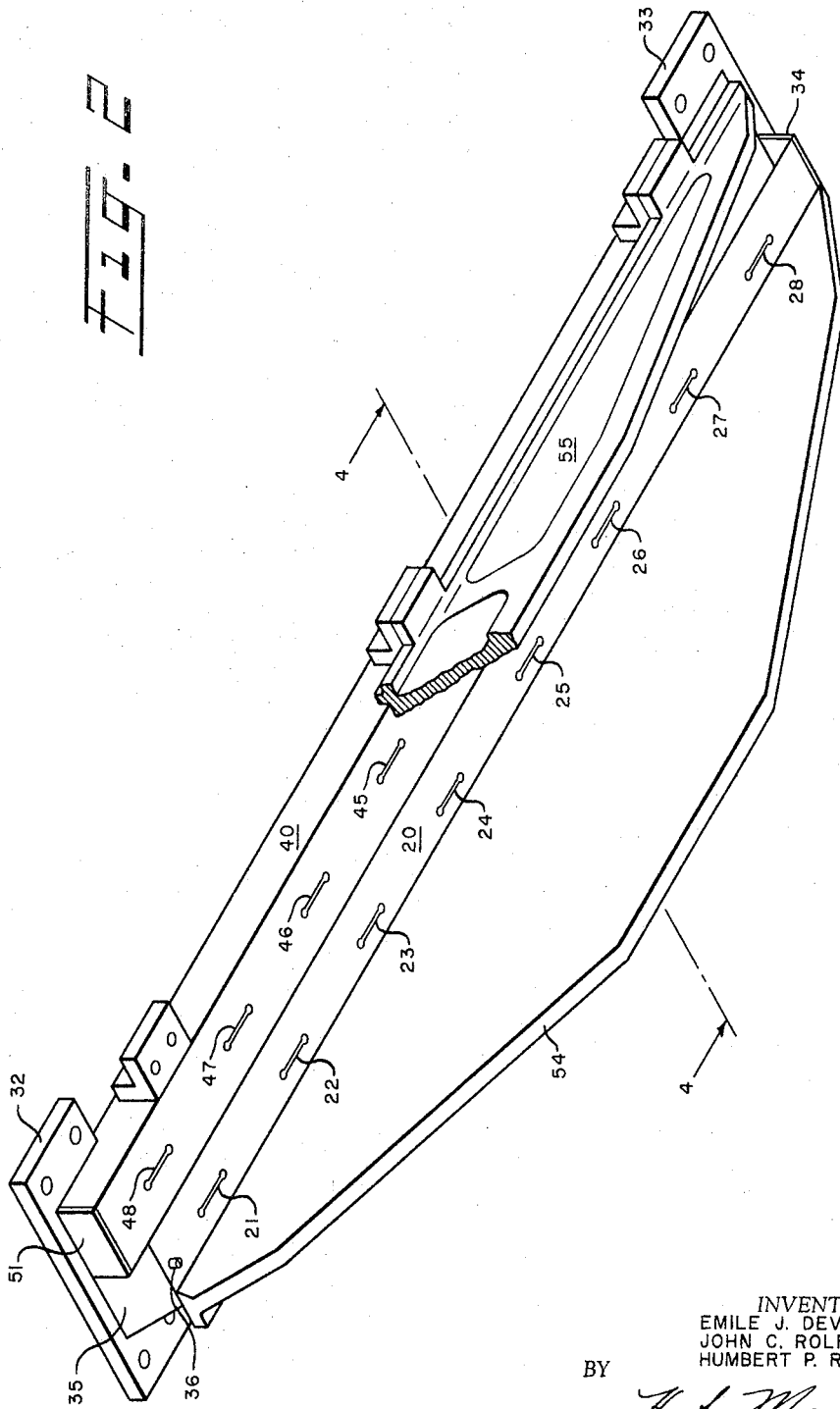

United States Patent Office 3,271,772
Patented Sept. 6, 1966

3,271,772
SLOT ANTENNA ARRAY WITH SIDE REFLECTORS
Emile J. Deveau and John C. Rolfs, Pleasantville, and Humbert P. Rossero, Peekskill, N.Y., assignors to General Precision, Inc., a corporation of Delaware
Filed Dec. 6, 1962, Ser. No. 242,665
5 Claims. (Cl. 343—771)

This invention relates generally to antennas and particularly to multiple beam antennas suitable for use in aviation navigation systems.

Navigation systems employing the Doppler frequency shift principle are currently in use in many aircraft. Such systems require the transmission from the aircraft of radio frequency energy in two or more beams, the reception of energy reflected from the earth, and the measurement of the change in frequency of the reflected energy. Various configurations of beams have been employed, one of the most satisfactory and widely used arrangements being that of four beams each directed to one of the quadrants beneath the aircraft. The beams are generated alternately in pairs, one pair illuminating the forward right and aft left quadrants, the other illuminating the forward left and aft right quadrants.

An antenna for generating these four beams should have a number of characteristics. First, each beam should be of such shape that its intersection with the ground lies substantially along an "isodop," that is, a hyperbolic line on the earth the reflection from any point of which produces the same frequency shift. Second, the antenna should be as small and light as possible since size and weight are always important in airborne equipment. Third, the illumination directly beneath the aircraft should be of very low intensity. Fourth, the illumination due to any one beam should be substantially greater in the desired quadrant than in the adjacent quadrant opposite the ground track for each and every transverse angle. Fifth, if the antenna is to be used in a pulsed system, each beam should not only have a high intensity at a low transverse angle (usually in the range from ten to thirty degrees) but should also radiate a lesser yet substantial amount of power at all larger transverse angles to or approaching ninety degrees. Such radiation at large transverse angles enhances the low altitude capabilities of the system.

It would appear at first glance that the construction of an antenna having the above-mentioned characteristics would be a matter of straightforward engineering design. However, it is significant that, although Doppler navigation systems employing linear array antennas have been widely used for many years, all of the antennas heretofore used have failed to meet one or more of the above requirements.

Various approaches to the problem have been tried. The individual radiators of the linear array have sometimes been staggered with respect to the center line and sometimes been all arranged on the same side of the center line. Several linear arrays have been positioned side by side to obtain directivity in the transverse direction. Reflectors on each side of each array have been used for the same purpose. These and other expedients have been tried singly and in combination but heretofore the individual beams have been too narrow in the transverse direction and/or there has been too much illumination in the undesired adjacent quadrant and/or the intensity directly beneath the aircraft has been too great and/or the assembly has been unduly large. These limitations have prevented the full use of Doppler navigation systems in high performance aircraft which must operate at low altitudes.

It is a general object of the present invention to provide an improved antenna suitable for use as a part of a Doppler radar navigation system.

Another object is to provide an improved antenna for radiating two pairs of beams of energy alternately, the beams of each pair being directed to diagonally opposite quadrants beneath an aircraft.

Another object is to provide an antenna for radiating beams as above mentioned in which each beam radiates energy of a maximum intensity at a small transverse angle and also radiates energy of a lower but significant intensity at larger transverse angles.

Another object is to provide an antenna for forming the four above-mentioned beams in which radiation in undesired directions is minimized.

Another object is to provide a four-beam antenna in which the intensity of each beam at any transverse angle in the desired quandrant substantially exceeds the intensity from the same beam at the corresponding angle in the adjacent quandrant.

Another object is to provide a four-beam antenna in which the intensity of radiation normal to the antenna is insignificant compared to the intensity in any desired direction.

The invention is based on the discovery that two particular linear arrays positioned in a particular manner combined with a single pair of planar reflectors cooperating with both arrays effectively concentrates the radiation in the desired directions while minimizing the radiation in unwanted directions. Briefly stated, a preferred embodiment of the invention comprises two identical rectangular waveguides placed side by side. Each waveguide has several radiating slots along one broad face, all positioned on the same side of the center line but at various distances therefrom to provide conventional tapered illumination. Before placing the waveguides side by side, one is turned end for end with respect to the other so that corresponding slots in the two waveguides are equidistant from the outside surfaces of the abutting faces of the two waveguides. Additionally, one waveguide is longitudinally displaced with respect to the other by one-half the distance between adjacent slots so that the slots in one waveguide are opposite the midpoint between the slots of the other waveguide. Two flat conductive reflectors are provided, one positioned in the vicinity of the narrow outside wall of each waveguide and splayed outward at an acute angle. Each reflector modifies the radiation from both waveguides so as to concentrate the radiation in the desired directions only.

For a clearer understanding of the invention, reference may be made to the following detailed description and the accompanying drawings, in which:

FIGURE 1 is a schematic view of the beams formed by the antenna of the invention when mounted on an aircraft;

FIGURE 2 is a pictorial view of the antenna;

FIGURE 3 is a schematic view of the arrangement of the slots of the antenna;

FIGURE 4 is a cross-section view taken on the plane 4—4 of FIGURE 2; and

FIGURE 5 is a graph showing the transverse radiation pattern of the antenna.

Referring now to FIGURE 1, there is shown an aircraft 11 which is assumed to be in level flight over horizontal terrain. A beam of radio frequency energy directed toward the earth will, upon reflection back to the aircraft, undergo a change in frequency. This change in frequency may be expressed as $$D = \frac{2V}{\lambda} \cos \gamma \qquad (1)$$

where $D$ = difference between transmitted and received frequency
$V$ = velocity of the aircraft
$\lambda$ = free space wavelength
$\gamma$ = angle between the velocity vector of the aircraft and the beam of energy.

A narrow beam of energy swept along the ground while the angle $\gamma$ is kept constant will define a hyperbola such as the hyperbola 12. This hyperbola is one of many "isodops," or lines of constant Doppler frequency shift, so called because a beam reflected from any point on the curve undergoes the same frequency shift.

The angle made by the beam in the transverse direction is denoted $\beta$, as shown in FIGURE 1.

The Doppler system with which the antenna of the present invention is intended to be used transmits four beams, 13, 14, 15, and 16, one directed to each quadrant beneath the aircraft. When the antenna is horizontal and aligned with the ground track of the aircraft, the gamma angles of the beams 13 and 14 are the same and equal to $\gamma_1$; the gamma angles of the beams 15 and 16 are the same and equal to $\gamma_2$ which equals $180° - \gamma_1$; the beams 14 and 16 are at a transverse angle $\beta$; and the beams 13 and 15 are at a transverse angle $-\beta$. The beams 13 and 16 are generated simultaneously and their generation is alternated at a rate on the order of one or two cycles per second with the generation of the beams 14 and 15. Beams generated simultaneously, for example the beams 13 and 16, are received simultaneously and mixed together. The reflected beam 13 is shifted upward in frequency while the reflected beam 16 is shifted downward in frequency. Mixing generates the difference frequency, which may be expressed as $$D_1 - D_2 = \frac{2V}{\lambda} \cos \gamma_1 - \frac{2V}{\lambda} \cos \gamma_2 \qquad (2)$$

Since $\cos \gamma_2 = -\cos \gamma_1$ $$D_1 - D_2 = \frac{4V}{\lambda} \cos \gamma_1 \qquad (3)$$

If the antenna is aligned with the ground track, as above assumed, the difference frequency produced by mixing reflected beams 13 and 16 will be the same as that produced by mixing reflected beams 14 and 15. If the antenna is turned about a vertical axis, for example clockwise as viewed from above, it is obvious that the beams 13 and 16 will be moved farther from the transverse line 17 thereby increasing the frequency shift of each and the difference therebetween while the beams 14 and 15 will be moved closer to the transverse line 17 thereby decreasing the frequency shift of each and the difference therebetween. In operation, the two difference frequencies are compared and any difference is used as an error signal to return the antenna to alignment with the ground track.

With the above background information in mind, the requirements, advantages and features of the present invention may be readily understood.

First, it is obvious that each beam should lie, to the greatest extent possible, along a single isodop, such as the hyperbola 12, so that as much of the returned energy as possible will be frequency shifted by the same amount. This requirement is met, as is well known, by the use of linear arrays.

Second, the energy directed to point P directly beneath the aircraft should be kept to a minimum. As previously mentioned, the energy from beams 13 and 16 is mixed to derive a frequency equal to their difference. Any energy reflected from point P undergoes no frequency shift and is therefore at the transmitter frequency. Normally, the intensity of illumination at point P, and the power of the energy reflected therefrom, is so small compared to that reflected from the main beams as to cause no trouble. However, under some conditions, the power of the energy reflected from point P is sufficient to mix with that from the other beams thereby producing a frequency equal to the difference between the transmitter frequency and each of the beams, which is only half as great as that produced by mixing only beams 13 and 16 (for example) thereby producing the "half-speed anomaly" which causes the instrument to indicate one-half the actual speed of the aircraft. This condition occurs principally when flying over very smooth water where the specular reflection at ninety degrees is much more effective than the back scattering from the angled beams 13–16.

Third, in a pulse system the receiver is gated off during pulse transmission and requires a finite time after the end of each pulse to recover sensitivity. At very low altitudes the slant range becomes so small that most if not all of the energy reflected from the main beams 13–16 arrives at the aircraft before the receiver has regained its sensitivity. Thus there is a lower altitude limit to successful operation. This difficulty is overcome in the present invention by providing a lesser but substantial intensity of radiation at large transverse (beta) angles up to nearly ninety degrees. The slant range at these large angles is large enough to allow sufficient time for the receiver to recover and operation has been found to be reliable at low altitudes right down to the runway.

Fourth, as the altitude of the aircraft decreases, the portions of the beams at small beta angles are gated off. As altitude continues to decrease, the main beams become ineffective. Actually, the beams are not true spots but some radiation extends to each side, even extending into the adjacent quadrant, as indicated by the dashed lines about the beam 13. Additionally, in physically realizable antennas, the intensity does not diminish uniformly with the distance from the desired spot, but consists of a number of minor lobes. While these lobes are always of lower intensity than the main beam, they become important when the reflection from the main beam is gated off. In prior art antennas there has often been one or more beta angles at which the intensity of radiation in the adjacent quadrant has been greater than that in the desired quadrant. For example, the radiation associated with the beam 13 may be greater at point Q in the adjacent quadrant than at the point R at the same beta angle in the desired quadrant. When the antenna is aligned with the ground track this is of no concern since the returned frequencies would be the same. However, when the antenna is not aligned with the ground track, all of the beams are skewed and the detection of reflected energy from the wrong quadrants causes the antenna servo to drive the antenna in the wrong direction, and operation fails. Such malfunction is prevented by the present invention in which for each ad every beta angle the radiation in the desired quadrant is greater than in the undesired quadrant.

Many linear array antennas have been proposed in the past. For example, a waveguide has been used in which slots were staggered on opposite sides of the center line, but such an array produces large minor lobes skewed with relation to the axis, sometimes called "butterfly" lobes. It has been proposed to use four or five arrays side by side, but such an antenna not only is bulky but may produce too narrow a beta pattern. It has been proposed to use a pair of reflectors for each of several arrays but such an arrangment radiates too much energy toward the adjacent quadrant. The usual prior arrangement of two arrays with corresponding slots at unequal distances from the center line between arrays produces too much radiation at boresight, that is, directly beneath the aircraft.

Referring now to FIGURE 2, there is shown a pictorial representation of the antenna in accordance with the invention as viewed from beneath an aircraft on which the antenna is installed. There is shown a linear array comprising a rectangular waveguide 20 which has a series of resonant longitudinal shunt slots 21–28 formed on one broad face. Each slot has a radiation pattern similar to that of a dipole. As best shown in FIGURE 3, which is schematic only and not to scale, all of the slots are formed on the same side of the center line 31 of the waveguide 20 but at varying distances therefrom. The slots 21, 22, 23 and 24 are formed at increasing distances from the center line 31; the slot 25 is at the same distance as the slot 24; and the slots 26, 27 and 28 are at the same distances as the slots 23, 22 and 21, respectively. These distances are selected to provide conventional tapered illumination, in this example, gable illumination, with a power taper of 4:1.

Referring again to FIGURE 2, the waveguide 20 is mounted on plates 32 and 33. One end of the waveguide 20 is closed by a shorting plate 34. The waveguide may be energized in various ways, one convenient arrangement being that shown in which it is fed from the end opposite the shorting plate 34 and from the side of the antenna opposite the slots through a suitable 90° bend, the outside plate of which is shown at 35 and a tuning screw for which is shown at 36.

There is also shown a waveguide 40 which is identical to the waveguide 20 and includes similar slots, 41–48, of which the slots 45–48 are visible in FIGURE 2. The waveguide 40 is also mounted on the plates 31 and 32 beside the waveguide 20 but turned end for end and positioned longitudinally so that the slots in the waveguide 40 lie opposite the spaces between the slots in the waveguide 20. The distance between the two arrays is selected in accordance with well-known principles to obtain the desired transverse or beta pattern. In the specific embodiment being described a suitable beta angle was obtained with the outside walls of the two waveguides abutting as shown. The waveguide 40 may conveniently be fed from the end opposite that of the waveguide 20 through a similar 90° bend. The opposite end is closed with a shorting plate 51. As best shown in FIGURE 3 the slots 41–48 are at varying distances from the center line 52 which distances are the same as those of the slots 21–28 of the waveguide 20.

The purpose in turning one waveguide end for end with respect to the other is so that, as shown in FIGURE 3, the rows of slots in the two waveguides are at equal distances from the antenna center line 53. The phase of the energy fed to the two arrays is such that in one mode of operation the slots 21 and 41 receive energy of the same phase thereby generating one pair of beams such as the beams 13 and 16 of FIGURE 1. To produce the beams 14 and 15 the phase of the energy fed to one of the waveguides is periodically reversed by external apparatus so that in this mode of operation the slots 21 and 41 receive energy with a phase difference of 180°.

Referring again to FIGURE 2, there are shown two planar conductive reflectors 54 and 55 which are positioned along the outside edges of the waveguides 20 and 40. As best shown in FIGURE 4, the reflectors are splayed outward with respect to each other each making angle $\theta$ with the normal to the broad faces of waveguides 20 and 40. The reflectors intersect these broad faces at a distance $x$ from the outside edge of each waveguide. The angle $\theta$ and the distance $x$ are selected for best operation. It has been found possible to reduce the volume of the antenna without impairing its operation by reducing the width of each reflector at each end as shown in FIGURE 2. Although the theory of operation in this respect has not been fully studied, it appears that such a reduction in width has an effect similar to that of increasing the taper.

It has been found that turning one array end for end so that the slots in the two arrays are bowed in the same direction from the antenna center line 53 substantially reduces the energy radiated directly beneath the aircraft as compared to an antenna in which both rows of slots are bowed in the same direction. It would be possible to place the arrays so that both rows of slots were bowed inwardly with respect to the center line 53 but at present the arrangement shown is preferred in which both rows of slots are bowed outwardly.

A specific embodiment of the invention has been constructed for use at K-band at a frequency of 13,325 mc. Each waveguide had inside dimensions of 0.477″ x 0.311″ with walls 0.040″ thick. The slots were spaced one-half a guide wavelength, or 1.192″ between centers. The maximum width of the reflectors, the distance $y$ in FIGURE 4, was approximately 1.4″; the distance $x$ approximately 0.125″; and the angle $\theta$ approximately 23°. As previously mentioned, the slots were displaced from the center line to provide a linear taper of 4:1.

An antenna as above described has been tested and its pattern measured. The center of each beam was at a gamma angle of approximately 68° and at a beta angle of approximately 23°. One significant result of the measurements is shown in FIGURE 5 which is a graph of the intensity of illumination from one beam at various beta angles with a constant gamma angle through the center of the beam. This amounts to measuring the intensity of one beam, such as beam 13, along the isodop 12 of FIGURE 1. It is significant to note that at each beta angle, the intensity in the desired quadrant is much greater than that in the adjacent quadrant. It is also to be noted that substantial radiation extends throughout the desired quadrant to beta angles up to 90°.

Another measurement showed that the intensity of illumination at every point along the line 17 of FIGURE 1, including the point P, was more than 28 db below the intensity at the center of the beam.

Another embodiment of the invention has been constructed for use at 8800 mc. This embodiment employed 10 slots in each array, formed in waveguides having inside dimensions of 0.722″ x 0.400″ with a wall thickness of 0.050″. The maximum width of each reflector was approximately 1.25″. The distance $x$ in FIGURE 4 was approximately 0.11″ while the angle $\theta$ was approximately 25°. The characteristics of this embodiment were found to be very similar to that of the previously described embodiment.

An interesting feature of the present invention not previously mentioned is that the Doppler frequency obtained by mixing two opposite beams, such as the beams 13 and 16 of FIGURE 1, is independent of the transmitter frequency. Each linear array of the present invention comprises uniformly spaced longitudinal slots all on the same side of the center line of a waveguide. In such a linear array, it is well known that a major lobe of radiation occurs at an angle gamma such that $$\cos \gamma = \frac{\lambda}{\lambda_g} + n\frac{\lambda}{s} \qquad (4)$$

where $\gamma$=angle between array axis and the beam
$\lambda$=free space wavelength
$\lambda_g$=wavelength in waveguide
$s$=spacing between adjacent radiators
$n=0, \pm1, \pm2$, etc.

One beam is formed when $n=0$ and the other when $n=-1$.

$$\cos \gamma_1 = \frac{\lambda}{\lambda_g} \qquad (5)$$

$$\cos \gamma_2 = \frac{\lambda}{\lambda_g} - \frac{\lambda}{s} \qquad (6)$$

$$D_1 - D_2 = (\cos \gamma_1 - \cos \gamma_2) \qquad (7)$$

Substituting Equations 5 and 6 into Equation 7

$$D_1 - D_2 = \frac{2V}{s} \qquad (8)$$

It is obvious from Equation 8 that the measurement of the Doppler frequency is independent of the transmitter frequency. Accordingly, the requirements for transmitter frequency stability are only those imposed by the transmitter and receiver circuits and variations do not change the calibration constant of the system.

It is apparent that the antenna of the present invention achieves the desired objectives. The desired radiation pattern is obtained as previously discussed. The antenna is small, the K-band embodiment being about 10.5" long x 2.5" wide x 2.5" deep.

Although a specific embodiment of the invention has been described in considerable detail, many modifications will occur to those skilled in the art. It is therefore desired that the protection afforded by Letters Patent be limited only by the true scope of the appended claims.

What is claimed is:

1. An antenna, comprising,
a first rectangular waveguide formed with a plurality of evenly spaced longitudinal slots along the length thereof,
all of said slots being displaced on the same side of the center line of said waveguide but at varying displacements progressively increasing from each end toward the center, and
a second rectangular waveguide identical to said first waveguide,
said waveguides being positioned side by side with one waveguide turned end for end with respect to the other, whereby lines joining the centers of slots on each waveguide are bowed in opposite directions with respect to each other.

2. An antenna, comprising,
two identical linear arrays,
each of said arrays comprising a rectangular waveguide having a plurality of longitudinal slots formed in one broad face,
all of said slots being formed on the same side of the center line of said broad face,
said waveguides being positioned side by side but with one waveguide turned end for end with respect to the other, and
two planar conductive reflectors positioned to that side of each waveguide which is remote from the other waveguide,
said reflectors being angled outwardly with respect to each other.

3. An antenna, comprising,
two identical linear arrays,
each of said arrays comprising a rectangular waveguide formed with a plurality of evenly spaced longitudinal slots in one broad face,
all of said slots being displaced on the same side of the center line of said waveguide but at varying distances progressively increasing from each end toward the center, whereby a line joining the centers of said slots is bowed outwardly with respect to said center line,
said arrays being positioned side by side with one array turned end for end with respect to the other, whereby lines joining the centers of slots on each waveguide are bowed in opposite directions with respect to each other, and
two planar conductive reflectors, one positioned adjacent to that side of each waveguide which is remote from the other,
said reflectors being splayed outwardly with respect to each other.

4. An antenna, comprising,
two identical linear arrays,
each of said arrays comprising a rectangular waveguide formed with a series of equally spaced longitudinal slots in one broad face,
all of said slots being formed on the same side of the center line of said broad face but laterally displaced therefrom by varying distances to provide tapered illumination,
said arrays being positioned beside each other but with one array turned end for end with respect to the other, and
two planar conductive reflectors, each intersecting said broad face of one of said waveguides in a longitudinal line adjacent to that edge which is remote from the other of said waveguides,
said reflectors being splayed outwardly with respect to each other.

5. An antenna, comprising,
two identical linear arrays,
each of said arrays comprising a rectangular waveguide formed with a plurality of longitudinal slots in one broad face,
said slots constituting individual radiators and being longitudinally spaced apart by a distance of one-half a waveguide wavelength between centers,
said slots all being formed on the same side of the center line of said broad face but being offset therefrom by varying distances to provide gable illumination,
said arrays being positioned side by side but with one array being turned end for end with respect to the other,
said arrays being longitudinally displaced with respect to each other by a distance equal to one-half the distance between slot center lines so that the slots in one array lie opposite the midpoints between the slots of the other array, and
two planar conductive reflectors having a length substantially equal to that of said waveguides,
said reflectors being positioned adjacent to the two outermost narrow walls of said waveguides so that both of said arrays lie between said reflectors,
said reflectors being splayed outwardly from said arrays and forming supplementary angles with said broad faces of said waveguides.

References Cited by the Examiner
UNITED STATES PATENTS

| | | | |
|---|---|---|---|
| 2,764,756 | 9/1956 | Zaleski | 343—771 |
| 2,911,644 | 11/1959 | Stavis | 343—771 |
| 2,940,075 | 6/1960 | Stavis et al. | 343—771 |
| 3,067,421 | 12/1962 | O'Nians et al. | 343—771 |

ELI LIEBERMAN, *Acting Primary Examiner.*

HERMAN KARL SAALBACH, *Assistant Examiner.*